United States Patent [19]
Matsuoka et al.

[11] Patent Number: 5,092,164
[45] Date of Patent: Mar. 3, 1992

[54] THERMAL AIR-FLOW SENSOR

[75] Inventors: Hiroki Matsuoka, Susono; Kenichi Ono, Chiryu, both of Japan

[73] Assignee: Toyota Jidosha Kabushiki Kaisha, Toyota, Japan

[21] Appl. No.: 656,607

[22] Filed: Feb. 15, 1991

[30] Foreign Application Priority Data

Feb. 16, 1990 [JP] Japan .................................. 2-33856

[51] Int. Cl.$^5$ .......................................... G01M 15/00
[52] U.S. Cl. ................................ 73/118.2; 73/204.14
[58] Field of Search .............. 73/118.2, 204.14, 204.11

[56] References Cited

U.S. PATENT DOCUMENTS 4,934,189  6/1990  Tanimoto et al. ............. 73/118.2 X

FOREIGN PATENT DOCUMENTS 55-50121   4/1980  Japan .
61-147924  9/1986  Japan .
61-147925  9/1986  Japan .
2209402    5/1989  United Kingdom .

Primary Examiner—Jerry W. Myracle
Attorney, Agent, or Firm—Kenyon & Kenyon

[57] ABSTRACT

A thermal type air flow sensor wherein a heat generating element is arranged in an intake system and a time for obtaining an increase in a temperature by a predetermined value is detected, which time corresponds to an amount of the intake air. This time is measured repeatedly at predetermined intervals in one full cycle of the pulsation, and a total amount of variation in one cycle is calculated by differences of the measured values at adjacent sampling timings, which integrated values are obtained throughout one full cycle. This total amount of variation is compensated by an absolute value of the integrated value of differences between the adjacent measured values, which corresponds to the effect of the change in the average measured value in one full cycle, induced by an acceleration or deceleration of the engine. This compensated variation amount is used to obtain a corrected intake amount value.

6 Claims, 9 Drawing Sheets

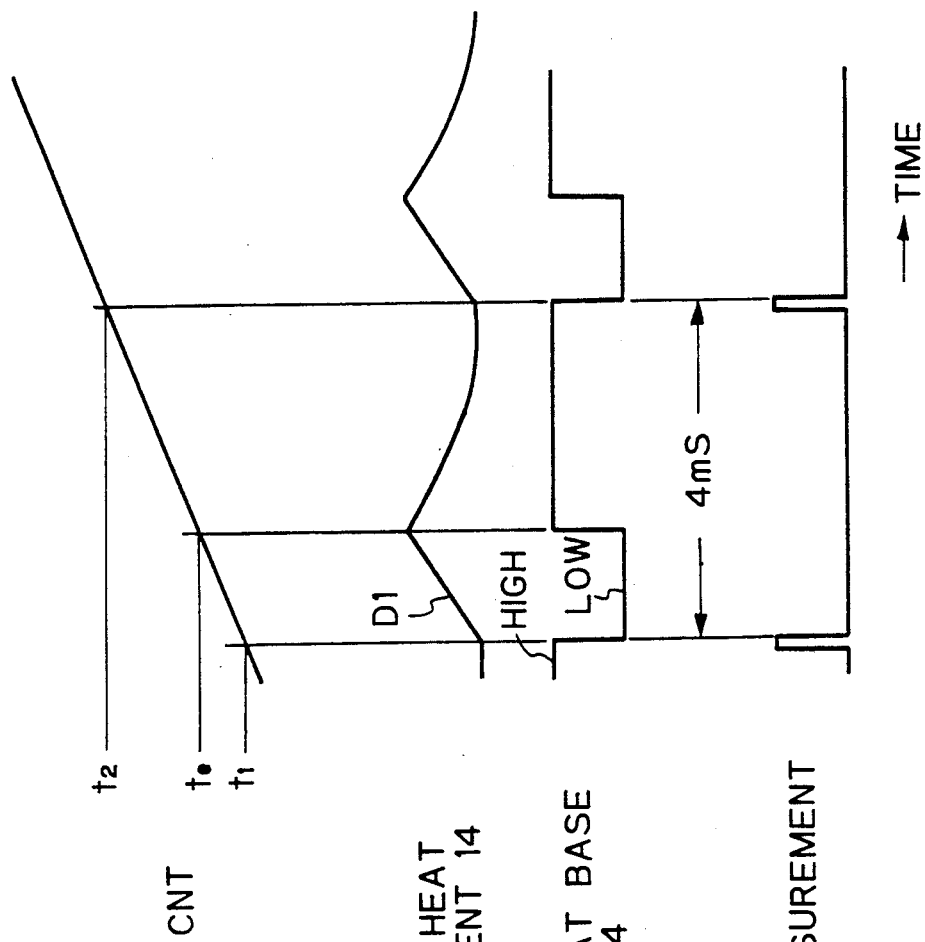

THERMAL AIR-FLOW SENSOR

BACKGROUND OF THE INVENTION

1. Field of the Invention

The present invention relates to a sensor for detecting an amount of intake air used for a control apparatus for an internal combustion engine.

2. Description of the Related Art

Known in a prior art is a thermal type airflow meter which includes a heat generating body arranged in an intake line of an internal combustion engine. A time for obtaining an increase of the temperature of a predetermined value of the body is measured, and an amount of the intake air is obtained from the measured time. The greater the increase of the speed of the intake air corresponding to the amount of the intake air, the longer the time needed for obtaining an increase of the temperature to the predetermined value. The measurement of this time makes it possible to determine the amount of intake air flowing into the internal combustion engine. (See Japanese patent Publication No. 55-50121)

In this type of the thermal type airflow meter, pulsative changes in the amount of the intake air, which are inevitable, cause variations in the amount of heat conducted for obtaining an increase of the temperature to a predetermined value, compared with that obtained when there are no pulsative changes even if an average amount of the intake air is maintained unchanged, causing a measurement error to occur. The reason for this is as follows. FIG. 1 shows a relationship between an intake air amount G and a conducted heat h, which is expressed by the following equation, $$h = \alpha + \beta \times \sqrt{G},$$

where $\alpha$ and $\beta$ are constant. Since the conduction of heat by the airflow meter is controlled by delay elements, such as thermal volume, the output value of the airflow meter, for one moment, is determined by a thermally conducted heat amount for a predetermined period prior to at moment, which results in a non-linear relationship between the G and the h. It is assumed that the flow amount is varied between the values of Gd and Gu, which causes the output to be moved between hd and hu, the mean value of which is hp'. When there is no pulsation of the intake air amount, a value of Gp, which is a mean value between the Gd and Gu, is attained and the output level is hp, which is different from the hp' found during the pulsative change of the intake air amount, and thus an error e occurs due to the pulsative changes in the flow amount of the intake air. As seen from FIG. 1, the existence of the pulsative change in the airflow amount causes the sensor output level to be made lower than that obtained when there is no pulsation. Furthermore, the greater the degree of the pulsation, the greater the amount of the error, and thus a calculation of the fuel injection amount based on the measured value of the intake air amount causes a shortage in the amount of fuel injected, and thus any air-fuel ratio of the combustible mixture introduced into the engine becomes much leaner than desired.

The Japanese Unexamined Utility Model Publication No. 61-14924 discloses a concept of calculating a ratio of an average value of the output from the air flow meter in a half period of one full cycle of a variation of the output level of the airflow meter, to thus provide a larger value, and an average value of the output in a remaining half period, to thus provide a smaller value. This ratio corresponds to a degree of pulsation in the output signal from the airflow meter. In this prior art, this value is used for the correction of a mean output value from the airflow meter, whereby a correct value of the intake air can be obtained which is not influenced by the effect of the pulsation.

This prior art calculates an integrated value of adjacent halves in one complete cycle of a variation of a sensor signal, a ratio of which integrated values is used to calculate a variation ratio, which is multiplied by an average value of the detected signal in one full cycle to obtain a corrected, precise value of the amount of the air introduced into the engine. This suffers from a drawback that, since a mean value in one full cycle is calculated to obtain the variation ratio, an acceleration or deceleration of the engine causes the value of the variation ratio to be displaced from the desired value. Also, such an acceleration or deceleration causes the mean value itself to be varied in one full cycle, which causes the integrated values found during consecutive half cycles to be changed independent by of the the effect of the pulsation. As a result, the variation ratio as a ratio of the integrated values in the consecutive half cycles in the sensor signal is different from the desired value, and accordingly, a correct compensation of the effect of the intake air amount pulsation on the intake air sensor signal can not be obtained, and thus a precise detection of the intake air amount can not be attained.

SUMMARY OF THE INVENTION

An object of the present invention is to provide a airflow sensor capable of detecting a precise value of the intake air amount which is not influenced by an acceleration or deceleration of the engine.

According to the present invention, an apparatus is provided for measuring an amount of air passed through an intake system for an internal combustion engine, which amount of air is pulsatively changed at a predetermined cycle, said apparatus comprising;

(a) a heat generating means arranged in the intake system for generating heat to be transmitted to the air flow;

(b) means for generating a timing signal for each sampling period which is shorter than the one full cycle of the pulsative change in the intake air amount;

(c) means for electrically energizing the heat generating means at each sampling period for measuring a time needed for obtaining a predetermined increase in a temperature of the heat generating element;

(d) means for calculating from said measured time at each sampling period, an amount of the intake air as measured;

(e) means for calculating at one full cycle an average of the measured values an intake air amount obtained at each sampling period;

(f) means for calculating at one full cycle a total amount of variation of the measured values at the sampling timings when the effect of the engine transient state on the total amount of the variation is eliminated, and;

(g) means for obtaining an average intake air amount corrected in accordance with the total amount of compensated variation.

BRIEF DESCRIPTION OF DRAWINGS

FIGS. 7(a) to (d) are timing charts illustrating the measuring operation of the sensor according to the present invention;

DESCRIPTION OF THE PREFERRED EMBODIMENTS

Figure 1:
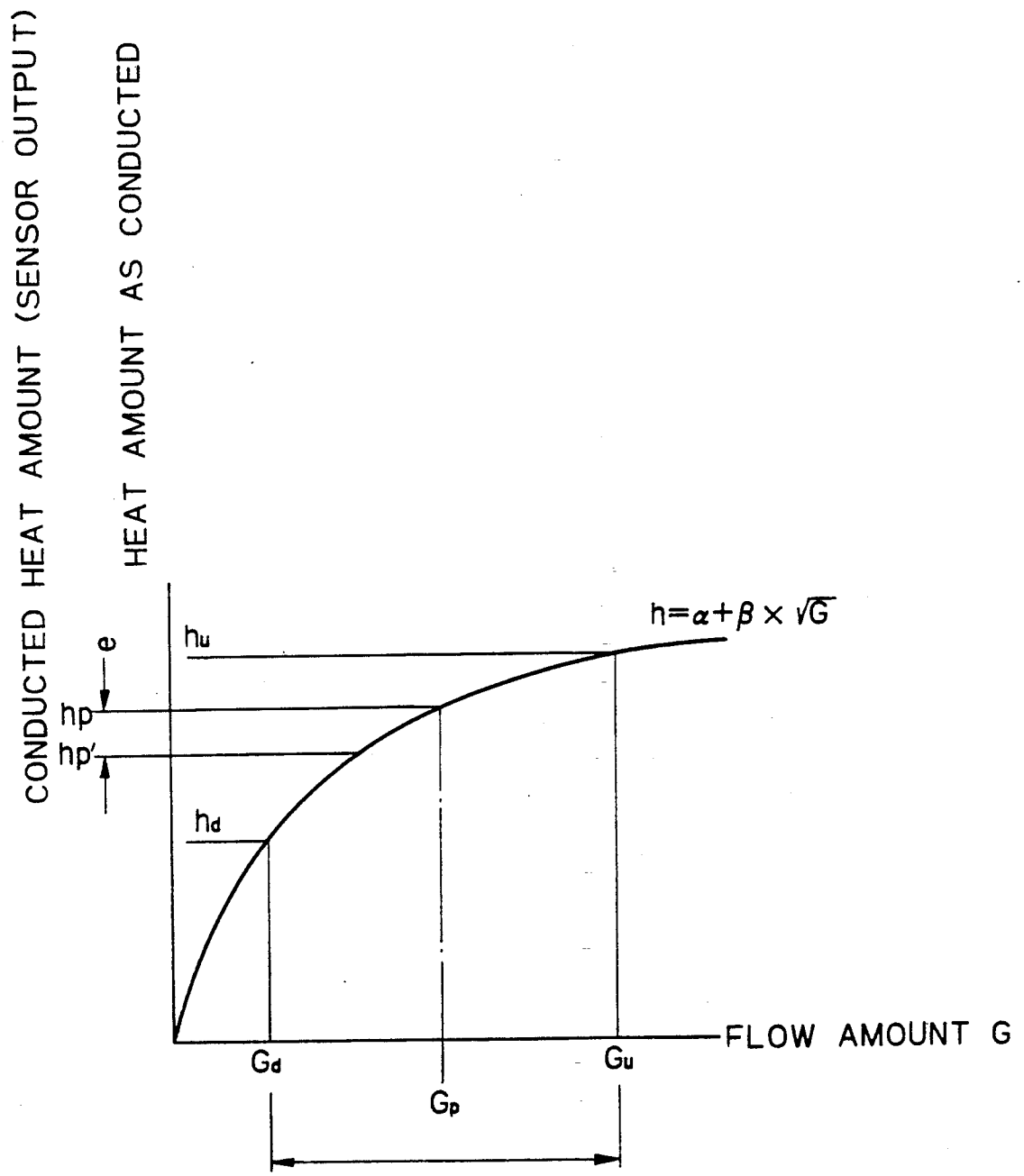
FIG. 1 shows a relationship between the intake air amount and an amount of heat conducted to the air.
Figure 2:
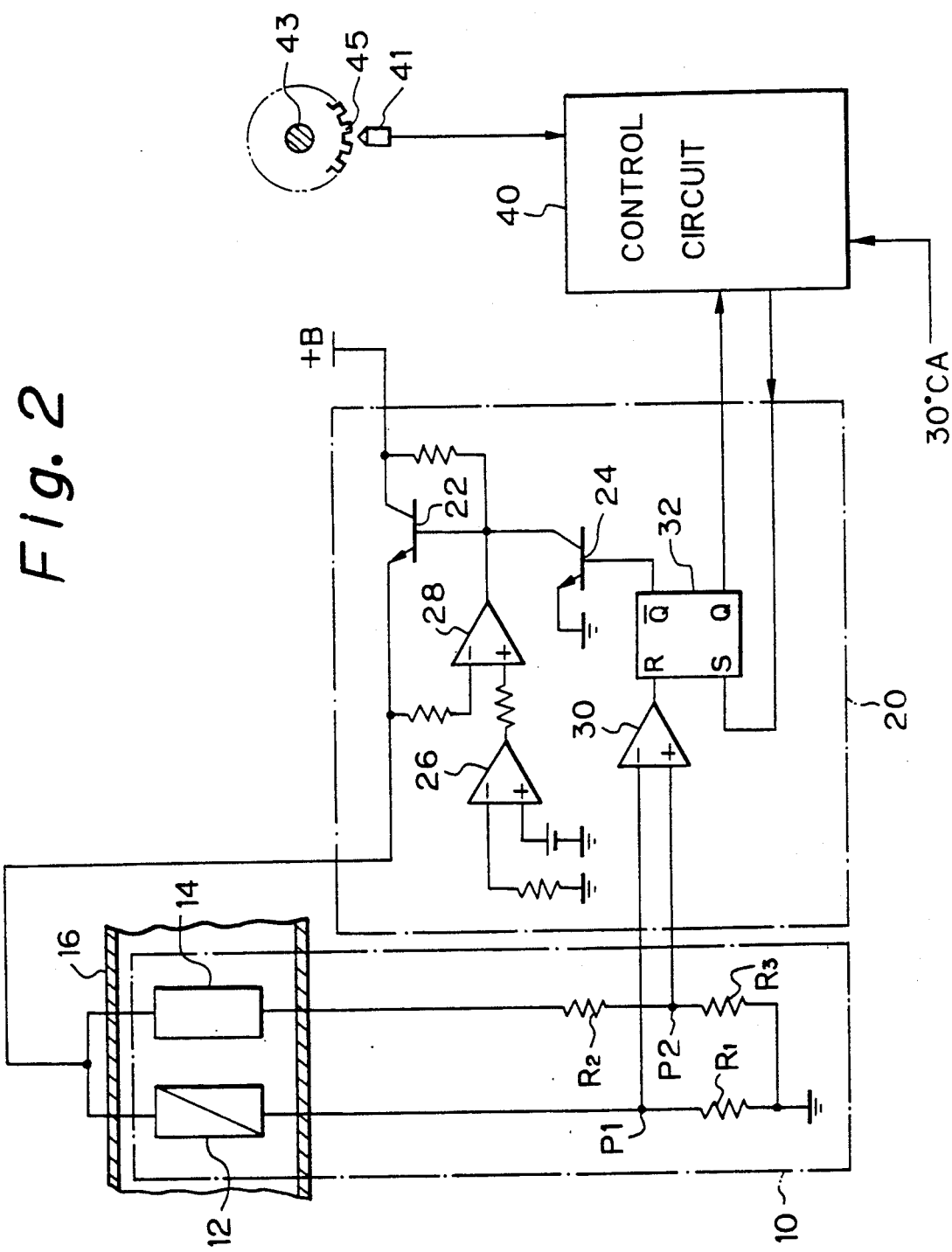
FIG. 2 shows a schematic view of the air flow sensor according to the present invention, together with an engine control circuit.

In FIG. 2, the airflow sensor includes a bridge circuit 10, comprising a temperature detection resister 12, a heat generating resistor 14, and adjusting resistors $R_1$, $R_2$ and $R_3$. The temperature detection resistor 12 and the heat generating resistor 14 are arranged in an intake pipe 16 of an internal combustion engine. The temperature detection resistor 12, the heat generating resistor 14, and the adjusting resistors $R_1$, $R_2$ and $R_3$ are interconnected so that a bridge circuit is constructed. The electric resistance value of the temperature detecting resistor 12 varies as the amount of air in the intake pipe introduced into the engine varies. A electric current control circuit 20 is provided for controlling the electric voltage applied to the heat generating resistor 14, so that the temperature of the heat generating resistor 14 is higher than that of the temperature detecting resistor 12 by a predetermined value. A means is provided for detecting a time at which the temperature of the heat generating resistor 14 is made higher than that of the temperature detecting resistor by the predetermined value, which time enables the intake air amount to the internal combustion engine to be determined.

The electric current control circuit 20 includes transistors 22 and 24, operating amplifiers 26, 28 and 30, and a flip-flop circuit 32. The transistor 22 controls the electric current in the heating resistance 14, and the operating amplifier 28 attains a feedback-control of a constant voltage of the electric voltage in the bridge circuit 10. The operating amplifier 28 is provided with an inverted input connected between the heat generating resistor 14 and transistor 22, and a non-inverted input connected to the operating amplifier 26, which applies a reference voltage to the operating amplifier 28 so that a constant voltage is applied to the bridge circuit 10. The bridge circuit 10 is provided with bridge points $P_1$ and $P_2$, which are respectively connected to inputs of the operating amplifier 30. The flip-flop circuit 32 is provided with a reset terminal R connected to the operating amplifier 30, a set terminal S connected to an engine control circuit 40, an inverted output connected to the base of the transistor 24, and a non-inverted output connected to the control circuit 40. The engine control circuit 40 is constructed as a micro-computer system for controlling the fuel injection amount and ignition timing. Such a fuel injection control and ignition timing control are not directly related to the present invention, and therefore, an explanation thereof is omitted.

As described later, the control of the application of the electric voltage by the bridge circuit 10 in this embodiment is carried out at intervals of 4 milliseconds. At the beginning of each interval of 4 milliseconds, a set signal is sent from the control circuit 40 to the set input S of the flip-flop circuit 32, which causes the inverted output of the flip-flop circuit 32 to become Low level. The low level at the inverted output of the flip-flop circuit 32 causes the transistor 24 to be made ON, whereby the voltage level at the base of the transistor 22 is made High. The high level at the base causes the transistor 22 to be made ON, which causes the heat generating resistor 14 to be energized. When the energization of the resistor 14 is commenced, the voltage levels at the bridge points $P_1$ and $P_2$ are not balanced ($P_1 > P_2$) but when the temperature of the heat generating element 14 is higher than that of the temperature sensing element 12, by a predetermined value, a balanced condition of the voltage levels at the bridge points $P_1$ and $P_2$ is obtained, and thus the operating amplifier 30 outputs a High level signal to the reset terminal R of the flip-flop circuit 32, which then outputs a High level signal from the inverted output thereof, making the transistor 24 ON. When the transistor 24 is made ON, the level at the base is made Low, and thus it is made OFF, whereby the supply of the electric current to the heat generating element 14 is stopped. The set terminal S and non-inverted output of the flip-flop circuit 32 are connected to the microcomputer 40, which is used for calculating the variation ratio and intake air amount from the time that the heat generating resistor 14 is energized.

In FIG. 2, a crank angle sensor 41 such as a Hall element is provided adjacent to a rotating element connected to a crankshaft (not shown) of an internal combustion engine. The rotating element is, for example, a distributing shaft 43 of a distributor (not shown) of the internal combustion engine. A toothed element 45 is connected to the shaft 43, so that the crank angle sensor 41 issues pulse signals at a predetermined angle of rotation of the crankshaft (CA), such as at 30 degrees CA.

Figure 3:
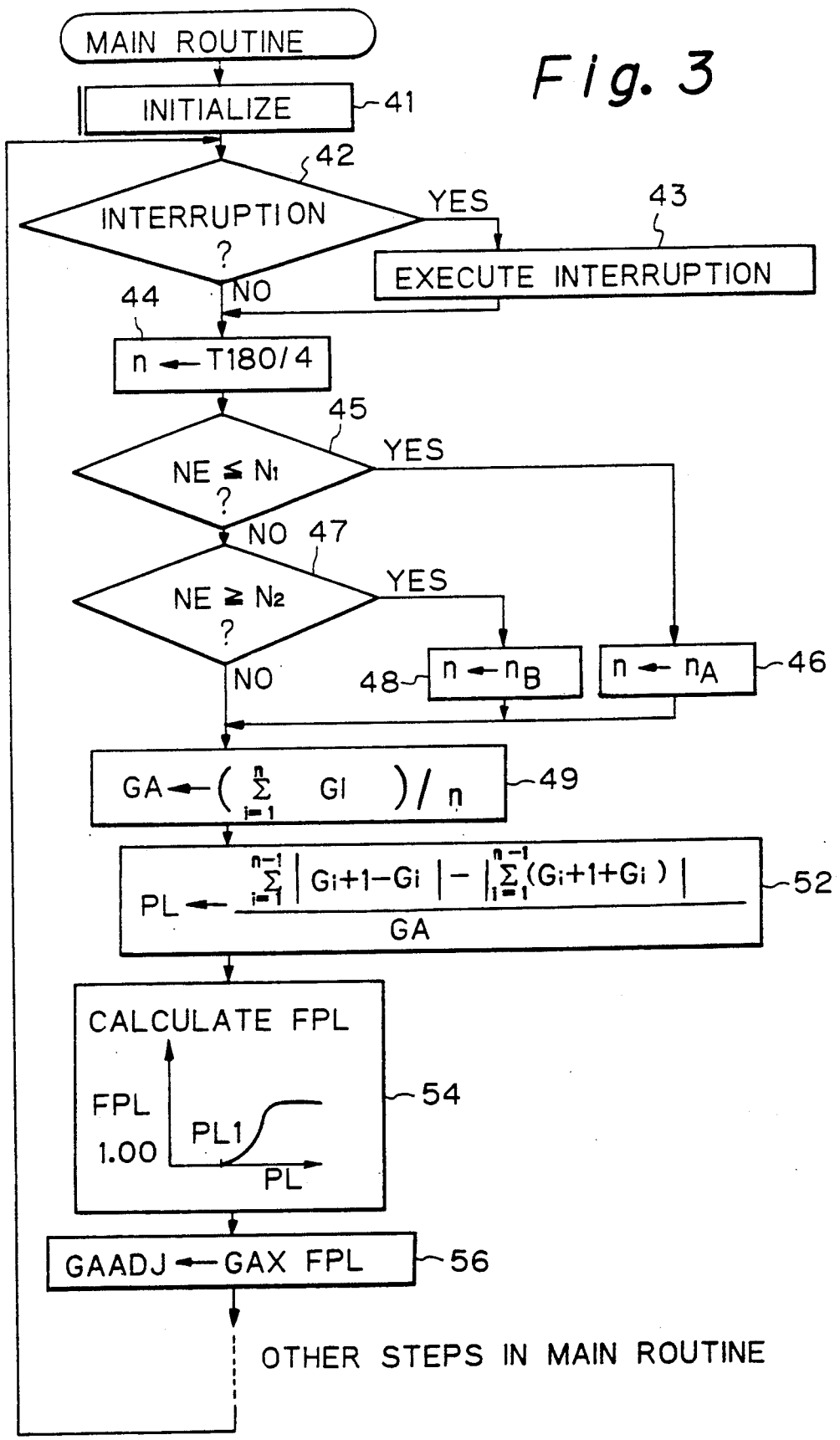
FIGS. 3 to 6 are flowcharts illustrating how the measurement of the intake air amount by the air-flow meter according to the present invention is carried out.

The operation of the microcomputer 40 will now be described with reference to attached the flowcharts. FIG. 3 shows a main routine which is executed when an ignition key switch (not shown) of the internal combustion engine is made ON. Step 41 generally shows an initialize routine which is adapted for initializing, for example, a RAM and registers. At the following step 42, it is determined if an interrupt requirement has occurred, and if so, the routine goes to step 43 to execute the interruption routines such as those shown in FIGS. 5 to 7.

Steps 44 to 49 show a part of the main routine for calculating a average intake air amount GA. At step 44, a number n of data of a corrected, measured intake air amount G in one measurement cycle, which is a basis for the calculation of the mean intake air amount GA, is calculated by $$n = T180/4,$$

where T180 is a time in milliseconds necessary for a rotation of the crankshaft (not shown) of a four cylinder internal combustion engine through an angle of 180 degrees, which corresponds to one cycle of pulsation in the intake air amount. For a six cylinder engine, a time necessary for rotating the crankshaft through an angle of 120 degrees is used, as it corresponds to one cycle of pulsation of the intake air for that engine. As described later, the measurement of the intake air amount is executed at intervals of 4 milliseconds, and thus the T180 divided by 4 corresponds to a number of data of the measured intake air amount for a period in which the crankshaft is rotated through 180 degrees. At step 49, an average value of consecutive data of the measured intake air amount of number n is calculated by $$GA = \left(\sum_{i=1}^{n} G_i\right)/n.$$

Figure 8A:
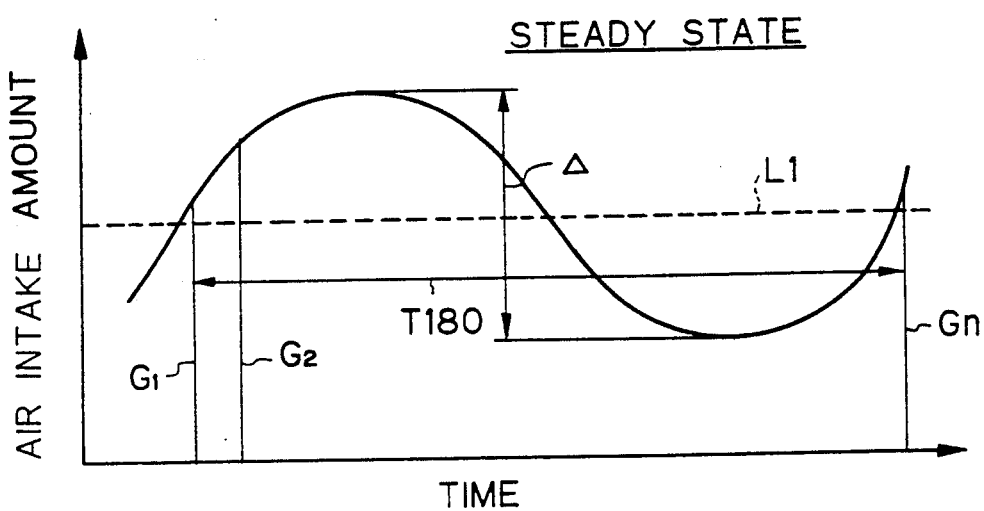
FIG. 8, which includes parts (a) and (b), schematically illustrates pulsative changes in the measuring signal from the sensor according to the present invention; and, FIGS. 9 and 10 are flowcharts of the second embodiment, which correspond to FIGS. 3 and 4, respectively, of the first embodiment.

This averaged measured intake air amount is used for compensating the pulsation of the values of the measured intake air amount occurring during the rotation of the crankshaft. As shown in FIGS. 8(a) and (b), a pulsative change occurs in the value of the intake air amount, one cycle of which corresponds to 180 degrees of rotation of the crankshaft when the engine has four cylinders. The average value GA of the intake air amount is an average for this cycle.

Steps 45 and 46 are guard routines for limiting the values of n, in accordance with engine speed NE. At step 45, it is determined if the engine speed NE is smaller than a predetermined value $N_1$. When it is determined that $NE \leq N_1$, the routine goes to step 46 and a predetermined value $n_A$ is moved to n. When the engine speed is small where T180, which is a time needed for a 180 degrees rotation of the crankshaft, is relatively longer, a large value number n is obtained, and thus a predetermined fixed value $n_A$, even if smaller than the value calculated at step 44, is sufficient to obtain a desired precision of the average intake air amount.

At step 47, it is determined if the engine speed is higher than a predetermined value $N_2$. When it is determined that the $NE \geq N_2$, the routine goes to step 48 and a predetermined value $n_B$ is moved to n. When the engine speed is high, sometimes a time for one full cycle is equal to or shorter than that for a sampling period of the intake air measurement. The predetermined value $n_B$ is selected so that a desired average value of the measured intake air amount is obtained, whereby the effect of the pulsation of the intake air amount is cancelled.

At step 52, a variation ratio PL i calculated by $$PL = \frac{\sum_{i=1}^{n-1} |G_{i+1} - G_i| - \left|\sum_{i=1}^{n-1} G_{i+1} - G_i\right|}{GA}$$

where the first term in the numerator $$\sum_{i=1}^{n-1} |G_{i+1} - G_{i1}|$$

corresponds to a total variation in the intake air amount Δin one full cycle of 180 degrees CA (one sampling period) in FIG. 8(a) or (b). In the above equation, the second term in the numerator $$\sum_{i=1}^{n-1} |G_{i+1} - G_i|$$

corresponds to a variation Δ' in an average value in the intake amount in one sampling period (180 degrees CA). When the engine is in a steady state, the second term would be zero as shown in FIG. 8(a), since the average measured value is unchanged throughout the cycle as shown by a dotted line L1, to obtain a result of $G_1 = G_n$, and therefore, the first term accurately corresponds to a variation caused by the pulsation in the intake air amount.

Figure 8B:
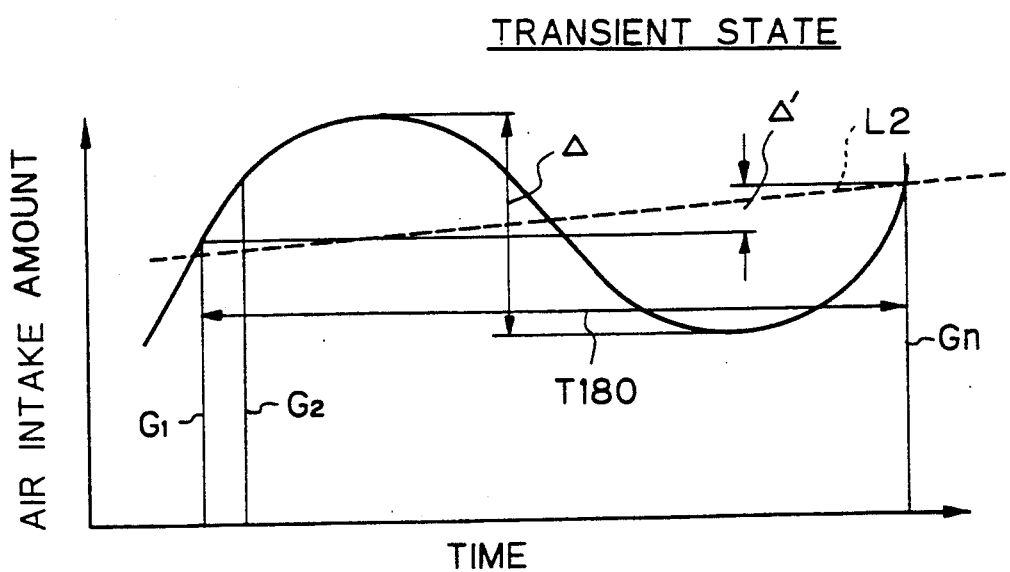

When the engine is under an acceleration or deceleration state, the Δ' is not zero, as shown in FIG. 8(b), since the average value in one cycle will change as shown by a dotted line L2. In this case, the second term corresponds to a change in the average value in one cycle, which is equal to the absolute value of $G_1 - G_n$, and by subtracting the second term from the first term, a variation caused only by the intake pressure pulsation itself can be taken out, as fully described later, and used for correcting the measured value to detect precise amount of intake air. The first term and the second term are divided by the average value for obtaining the variation ratio, which corresponds to a ratio of the total variation to the average value in one variation cycle of 180 degrees CA.

In FIG. 3, at step 54, a factor FPL is calculated and is used for converting the variation ratio PL to a correction factor FPL. A desired relationship between the variation ratio PL and the correction factor is such that, when the variation ratio is smaller than a predetermined value $PL_1$, the correction factor is maintained at 1.0, and accordingly, a correction of the measured intake air amount is not carried out, and such that, when the variation ratio is higher than a predetermined value $PL_1$, the correction factor is increased in accordance with the increase in the value of the PL. It should noted that a map of data of values of the correction factor FPL with respect to the values of the correction ratio $PL_1$ is provided, and a well known map interpolation is carried out to obtain a value of the correction factor FPL corresponding to the value of the $PL_1$ calculated at the step 52.

At step 56, a corrected average intake air amount GAADJ is calculated by $$GAADJ = GA \times FPL,$$

and is used for calculating the fuel injection amount and ignition timing.

Figure 4:
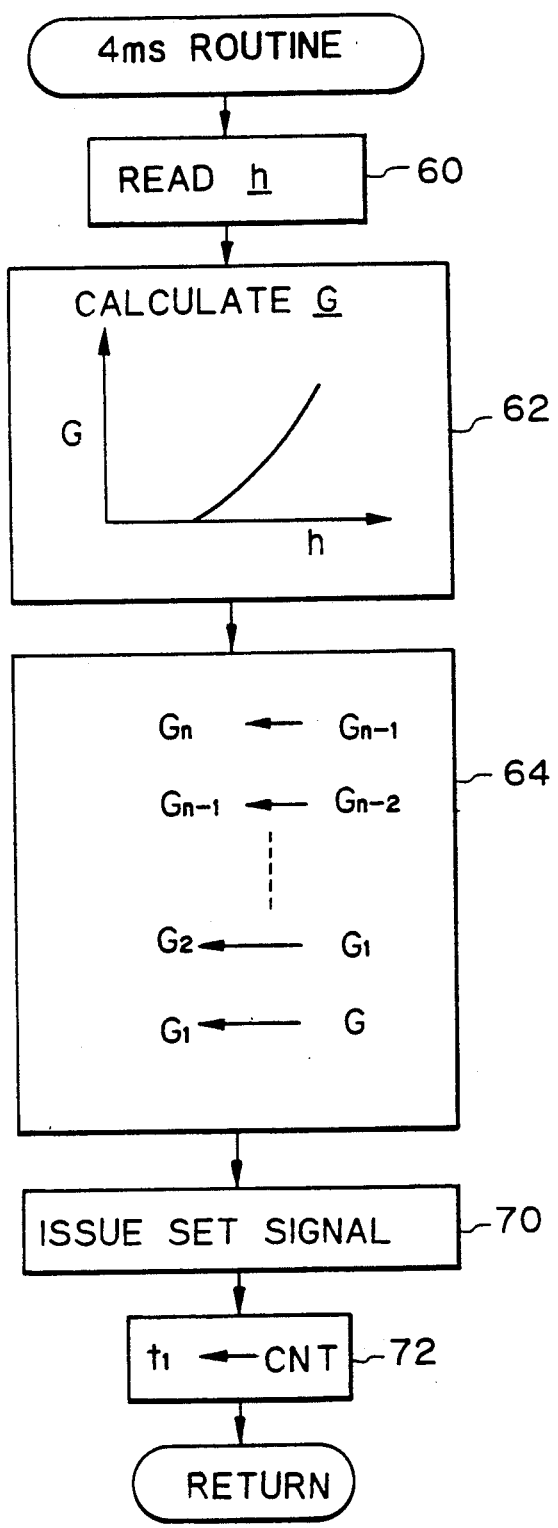

FIG. 4 shows a routine which is executed at intervals of 4 milliseconds. At step 60, a value of data of an energizing period h is read out. This is an ON time of the heat generating element 14 obtained when this routine is carried out at the preceding timing, i.e., 4 milliseconds before. At step 62, a measured intake air amount G at this moment is calculated from the h. A predetermined relationship which exists between the intake air amount G and the ON time h is stored as a map in a memory of the microcomputer 40, and a map interpolation calculation is carried out to obtain a value of the intake air amount G corresponding to the read out energizing time h. At the following step 64, consecutive measured values of intake air amounts $G_1, G_2, \ldots,$ and $G_n$ of number of n are updated, i.e., the newest measured value G at step 62 is moved into $G_1$ and the previous value of $G_1$ is moved into $G_2$. Similarly, the previous value $G_{n-1}$ is moved into $G_n$. At step 70, a set signal is output to the set terminal of the flip-flop circuit 32 from the control circuit 40 whereby the heat generating element 14 is energized for 4 milliseconds. Then, at step 7, a value of a counter CNT is moved into $T_1$; this indicates the time at which the energization of the heater element 14 of this period is commenced.

Figure 5:
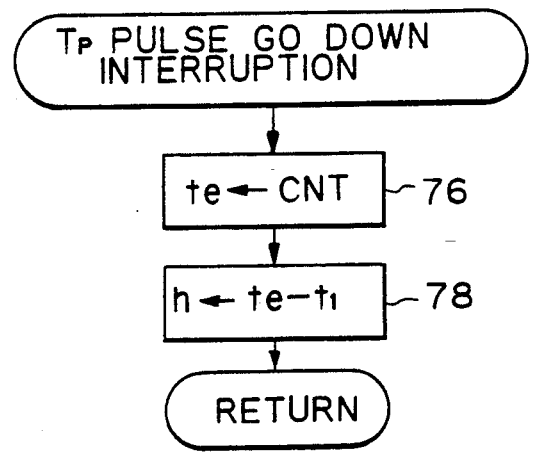

FIG. 5 shows a routine which is commenced when a condition of the non-inverted output from the flip-flop circuit 32 is changed from High to Low, i.e., the heat generating element 14 is made OFF because the temperature of the heat generating element 14 is higher than that of the heat measuring element 12, by a predetermined value. At step 76, the value of the counter CNT is moved into $t_e$, which indicates the time at which the energization of the heater element 14 of this period is stopped. At step 78, the ON time h of this cycle is calculated as $t_e$ subtracted by $t_1$. Namely, $t_e - t_1$ is a time at which the heat generating element 14 is energized at this cycle of 4 milliseconds, and is used for calculating the intake air amount G at step 62 during the execution of the following 4 milliseconds routine in FIG. 4.

Figure 6:
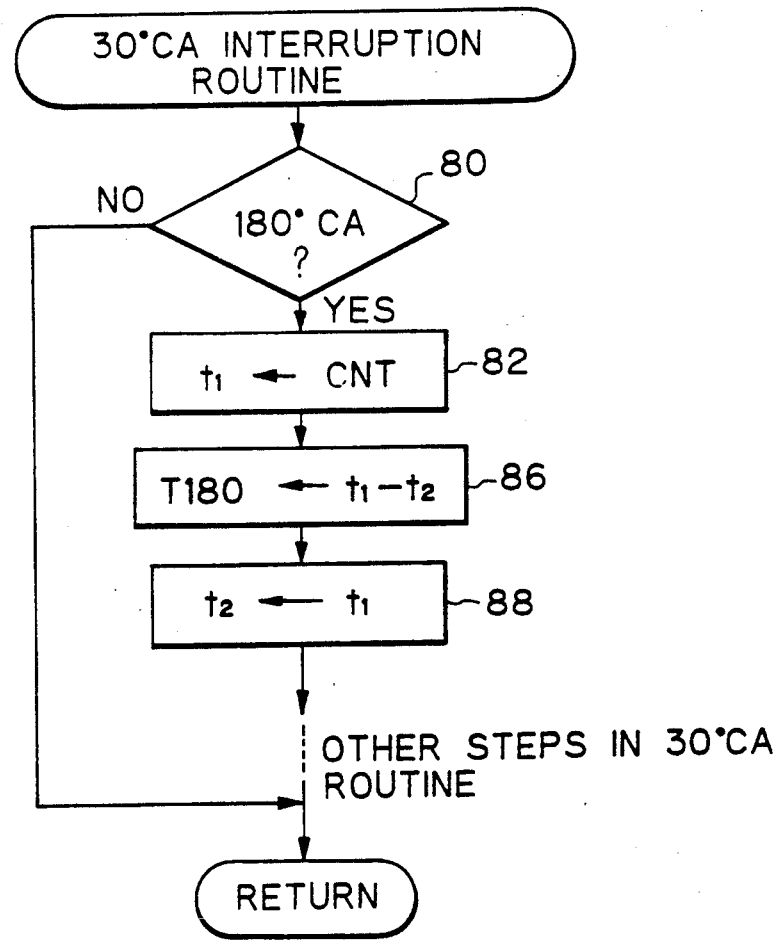

FIG. 6 shows a crank angle interruption routine carried out at the output of each 30 degrees pulse signal from the crank angle sensor 41. At step 80, it is determined if the crankshaft has rotated through 180 degrees CA, which corresponds to one complete cycle of pulsative change in the intake air in the four cylinder engine in this embodiment. When the result at step 80 is YES, the routine goes to step 82 and the value of the counter CNT is moved to $t_1$. At step 86, the time T180 needed for a rotation through 180 degrees by the crankshaft, and corresponding to one complete cycle of pulsative change in the intake air amount, is calculated as $t_1$ subtracted by $t_2$, and at step 88, the value of $t_1$ obtained at step 82 is moved to $t_2$. In this routine in FIG. 6, other routines to be executed at each 30 degrees CA signal are carried out, such as a fuel injection control and ignition timing control, as is well known.

FIG. 7(a) to (d) illustrate how the timing control in the first embodiment is carried out. The value of the counter CNT is continuously increased, as when in FIG. 7(a), and at a time $t_1$, a set signal is output to the flip-flop circuit 32 at step 70 in FIG. 4, whereby the voltage at the base of the transistor 24 is made low level, causing the transistor 24 to be made OFF, and the transistor 22 to be made ON, and thus the heating of the heat generating element 14 is commenced. As a result, the temperature of the element 14 is increased as shown by a line D1 in FIG. 7(b).

At a time $t_e$, i.e., when the temperature of the heat generating element 14 is higher than that of the temperature detecting element 12 by the predetermined value at step 76 in FIG. 5, the voltage levels at the bridge points $P_1$ and $P_2$ are balanced, and therefore, the flip-flop circuit 32 is reset, the voltage level at the base of the transistor 24 is made high, as shown by FIG. 7(c), causing the transistor 24 to be made ON and the transistor 22 to be made OFF, and thus the heat generating element 14 is de-energized.

This process is repeated at each measuring timing as shown in FIG. 7(d), at intervals of 4 milliseconds.

Figure 9:
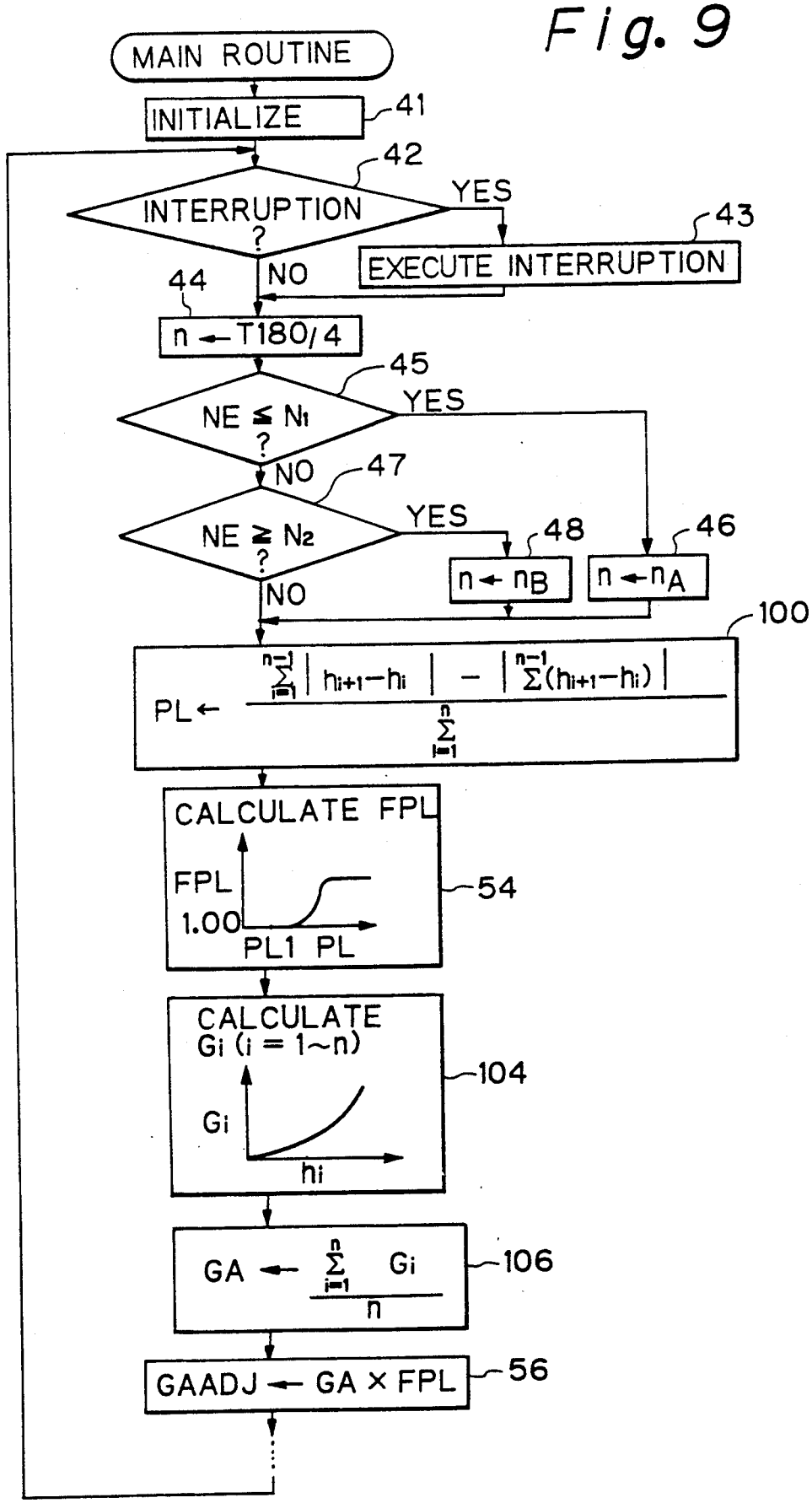
Figure 10:
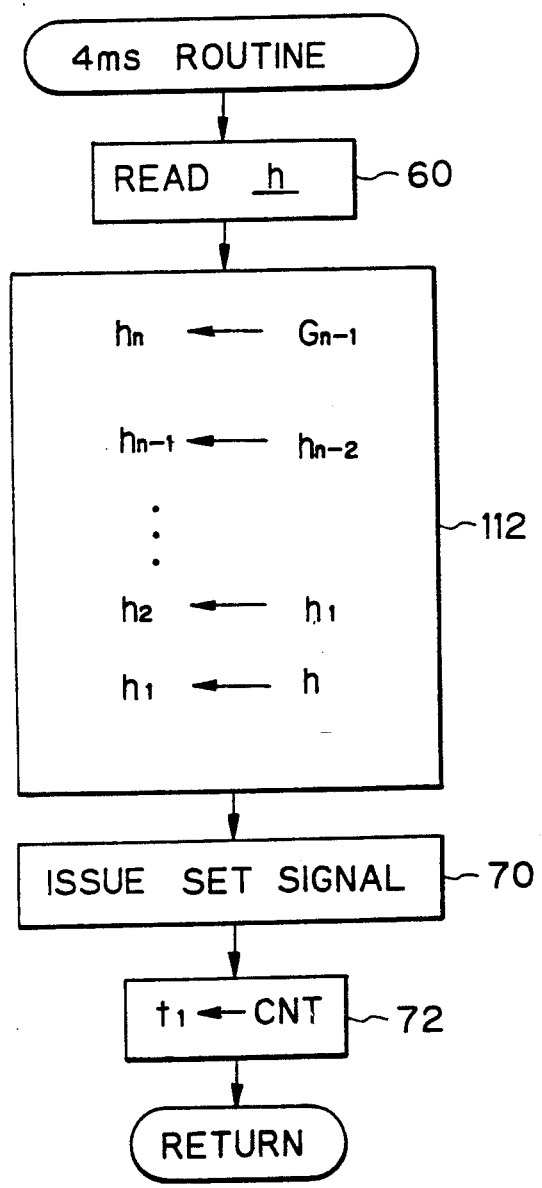

FIGS. 9 and 10 show second embodiment. In FIG. 10, steps 42 to 48 are the same as those in FIG. 3 in the first embodiment. In step 100, a variation rate PL is calculated by $$PL = \frac{\sum_{i=1}^{n-1} |h_{i+1} - h_i| - \left| \sum_{i=1}^{n-1} (h_{i+1} - h_i) \right|}{\sum_{i=1}^{n} h_i}$$

In the first embodiment, at step 52 the variation rate PL in the measured intake air amount in one cycle of the variation is calculated from the value of the measured intake air amount $G_i$, as transformed from the energizing period hi of the heater element 14 (step 62 in FIG. 4). Conversely, the variation rate is directly calculated from the energizing period $h_i$ before it is transformed into the measured intake air amount $G_i$.

At step 54 the variation rate PL is converted into the variation factor FPL, as in step 54 in FIG. 3.

At step 104, values of the intake air amount $G_1$, $G_2$, ..., $G_n$ are obtained from the measured values of the energizing time $h_1$, $h_2$, ..., $h_n$ in the one cycle which will be obtained step 112 in FIG. 10, using the same map between the energizing time h and the intake air amount G as in the step 62 in FIG. 4. At step 106, an average value of the intake air amount GA at the one full cycle is calculated, as in step 49 of FIG. 3. At step 56 the corrected intake air amount GAADJ is calculated from the average intake air amount GA multiplied by the variation correction factor FPL, as in step 56 in FIG. 3.

FIG. 10 shows an interruption routine executed, at intervals of milliseconds, for controlling the energization of the heat generating element 14; this is similar to FIG. 4 of the first embodiment, except for step 112. In this embodiment, the conversion to the intake air $G_i$ is not carried out by the routine shown in FIG. 10, as in FIG. 4 at step 62, instead at step 112, the values of energizing time $h_1$, $h_2$, ..., $h_i$ in one full cycle of the intake air amount variation are updated and used for calculating the variation rate PL at step 100 in FIG. 9. The steps 60, 70 and 72 are the same as those in FIG. 4.

Although embodiments of the present invention are described with reference to the attached drawings, many modifications and changes can be made thereto by those skilled in this art.

I claim:

1. An apparatus for measuring an amount of air passed through an intake system for an internal combustion engine, which amount of air is pulsatively changed at a predetermined cycle, said apparatus comprising;
   (a) a heat generating means arranged in the intake system for generating heat to be transmitted to the air flow;
   (b) means for generating a timing signal for each sampling period which is shorter than the one full cycle of the pulsative change in the intake air amount;
   (c) means for electrically energizing the heat generating means at each sampling period and for measuring a time needed to obtain a predetermined increase in a temperature of the heat generating element;
   (d) means, for calculating from said measured time at each sampling period an amount of the intake air as measured;
   (e) means for calculating at said one full cycle an average of the measured values obtained at each of said sampling periods;
   (f) means for calculating at said one full cycle a total amount of variation of the measured values at the sampled timings while the effect of the engine transient state on the total amount of the variation is eliminated, and;

(g) means for obtaining an average intake air amount corrected in accordance with the total amount of variation.

2. An apparatus for measuring an amount of air passed through an intake system for an internal combustion engine, which amount of air is pulsatively changed at a predetermined cycle, said apparatus comprising;

(a) a heat generating means arranged in the intake system for generating heat to be transmitted to the air flow;

(b) means for generating a timing signal for each sampling period which is shorter than the one full cycle of the pulsative change in the intake air amount;

(c) means for electrically energizing the heat generating means at each sampling period, and for measuring a time needed to obtain a predetermined increase in a temperature of the heat generating element;

(d) means for calculating from said time at each sampling period an amount of the intake air as measured;

(e) means for calculating at said one full cycle an average of the measured values obtained at each of said sampling periods;

(f) means for compensating at said one full cycle the calculated total amount of the variation of the measured values obtained at the sampling periods;

(g) means for compensating at said one full cycle the calculated total amount of the variation so that an effect on the total amount of the intake air amount variation caused by a transient state of the engine is eliminated, and;

(h) means for obtaining an average intake air amount corrected in accordance with the total amount of the variation as compensated.

3. An apparatus for measuring an amount of air passed through an intake system for an internal combustion engine, which amount of air is pulsatively changed at a predetermined cycle, said apparatus comprising;

(a) a heat generating means arranged in the intake system for generating heat to be transmitted to the air flow;

(b) means for generating a timing signal for each sampling period which is shorter than the one full cycle of the pulsative change in the intake air amount;

(c) means for electrically energizing the heat generating means at each sampling period and for measuring a time needed to obtain a predetermined increase in a temperature of the heat generating element;

(d) means for calculating from said time at each sampling period an amount of the intake air as measured;

(e) means for calculating at said one full cycle an average of the measured values obtained at each of said sampling periods;

(f) means for integrating at said one full cycle absolute values of the difference of the measured values obtained at consecutive sampling timings;

(g) means for calculating at said one full cycle an absolute value of the integrated values of the difference of the measured values obtained at consecutive sampling timings, and;

(h) means for obtaining an average intake air amount corrected in accordance with the integrated value at (f) subtracted by the absolute value at (g).

4. An apparatus for measuring an amount of air passed through an intake system for an internal combustion engine, which amount of air is pulsatively changed at a predetermined cycle, said apparatus comprising;

(a) a heat generating means arranged in the intake system for generating heat to be transmitted to the air flow;

(b) means for generating a timing signal for each sampling period which is shorter than the one full cycle of the pulsative change in the intake air amount;

(c) means for electrically energizing the heat generating means at each sampling period for measuring a time needed to obtain a predetermined increase in a temperature of the heat generating element;

(d) means for calculating from said measured time at each sampling period an amount of the intake air as measured;

(e) means for calculating at said one complete cycle an average of the measured values obtained at each of said sampling periods;

(f) means for integrating at said one full cycle absolute values of the difference of the measured values obtained at consecutive sampling timings;

(g) means for calculating at said one full cycle an absolute value of the integrated values of the difference of the measured values obtained at consecutive timings, and;

(h) means for integrating at one full cycle the measured value at the sampling periods;

(i) means for calculating a ratio of the integrated value at (f) subtracted by the absolute value at (g) to the integrated value at (h), and;

(j) means for obtaining an average intake air amount corrected in accordance with the ratio obtained at (i).

5. An apparatus for measuring an amount of air passed through an intake system for an internal combustion engine, which amount of air is pulsatively changed at a predetermined cycle, said apparatus comprising;

(a) a heat generating means arranged in the intake system for generating heat to be transmitted to the air flow;

(b) means for generating a timing signal for each sampling period which is shorter than the one full cycle of the pulsative change in the intake air amount;

(c) means for electrically energizing the heat generating means at each sampling period for measuring a time needed to obtain a predetermined increase in a temperature of the heat generating element;

(d) means for calculating from said measured time at each sampling period an amount of the intake air as measured;

(e) means for calculating at said one full cycle an average of the measured values of intake air amount obtained at each of said sampling periods;

(f) means for integrating at said one full cycle absolute values of the difference of the measured intake air amount values obtained at consecutive sampling timings;

(g) means for calculating at said one full cycle an absolute value of the integrated values of the differences of the measured intake air amount values obtained at consecutive sampling timings;

(h) means for integrating at one full cycle the measured intake air amount value at the sampling periods;
(i) means for calculating a ratio of the integrated value at (f) subtracted by the absolute value at (g) to the integrated value at (h),
(j) means for calculating a correction factor from the variation ratio at (i), and;
(k) means for obtaining an average intake air amount corrected by multiplying the correction factor at (j) by the average value at (e).

6. An apparatus for measuring an amount of air passed through an intake system for an internal combustion engine, which amount of air is pulsatively changed at a predetermined cycle, said apparatus comprising;
(a) a heat generating means arranged in the intake system for generating heat to be transmitted to the air flow;
(b) means for generating a timing signal for each sampling period which is shorter than the one full cycle of the pulsative change in the intake air amount;
(c) means for electrically energizing the heat generating means at each sampling period for measuring a time needed to obtain a predetermined increase in a temperature of the heat generating element;
(d) means for calculating from said measured time at each sampling period, an amount of the intake air as measured;
(e) means for calculating at said one full cycle an average of the measured time values obtained at each of said sampling periods;
(f) means for integrating at said one full cycle absolute values of the difference of the measured time values obtained at consecutive sampling timings;
(g) means for calculating at said one full cycle an absolute value of the integrated values of the difference of the measured time values obtained at consecutive timings;
(h) means for integrating at one full cycle the measured time value at the sampling periods;
(i) means for calculating a ratio of the integrated value at (f) subtracted by the absolute value at (g) to the integrated value at (h);
(j) means for calculating at said one full cycle an average value of the intake air amount at (d);
(k) means for calculating a correction factor from the variation ratio at (i), and;
(l) means for obtaining an average intake air amount corrected by multiplying the correction factor at (k) by the average value at (j).

* * * * *

UNITED STATES PATENT AND TRADEMARK OFFICE
CERTIFICATE OF CORRECTION

PATENT NO. : 5,092,164
DATED : March 3, 1992
INVENTOR(S) : Matsuoka et al.

It is certified that error appears in the above-identified patent and that said Letters Patent is hereby corrected as shown below:

Column 1, line 42, change "at" to -- that --

Column 2, line 24, change "independent" to -- independently -- line 24, change "by of" to -- of -- line 34, change "a" to -- an -- line 58, change "an" to -- of an --

Column 3, line 35, change "A" to -- An --

Column 4, line 57, change "a" to -- an --

Column 5, line 34, change "where" to -- when -- line 55, change "$G_{i+1} - G_i$" to -- $G_{i+1} - G_i$ -- line 62, change "$G_{i+1} - G_i$" to -- $G_{i+1} - G_i$ --

UNITED STATES PATENT AND TRADEMARK OFFICE
CERTIFICATE OF CORRECTION

PATENT NO. : 5,092,164
DATED : March 3, 1992
INVENTOR(S) : Matsuoka et al.

It is certified that error appears in the above-identified patent and that said Letters Patent is hereby corrected as shown below:

Column 6, line 3, change "$G_{i+1} - G_i$" to

-- $G_{i+1}-G_i$ --both occur--.

Column 8, line 4, change "$h_{i+1} - h_i$" to

-- $h_{i+1}-h_i$ -- line 12, change "hi" to -- $h_i$ --
line 21, change "step" to -- at step --

Signed and Sealed this

Twenty-second Day of February, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,092,164

DATED : March 3, 1992

INVENTOR(S) : Matsuoka et al

It is certified that error appears in the above-indentified patent and that said Letters Patent is hereby corrected as shown below:

On the title page, item [73] Assignee: "Toyota Jidosha Kabushiki Kaisha, Toyota, Japan" should read --Toyota Jidosha Kabushiki Kaisha and Nippondenso co., Ltd., Toyota, Japan--.

Signed and Sealed this

Twenty-sixth Day of April, 1994

Attest:

BRUCE LEHMAN

*Attesting Officer*     *Commissioner of Patents and Trademarks*